Figure 1:
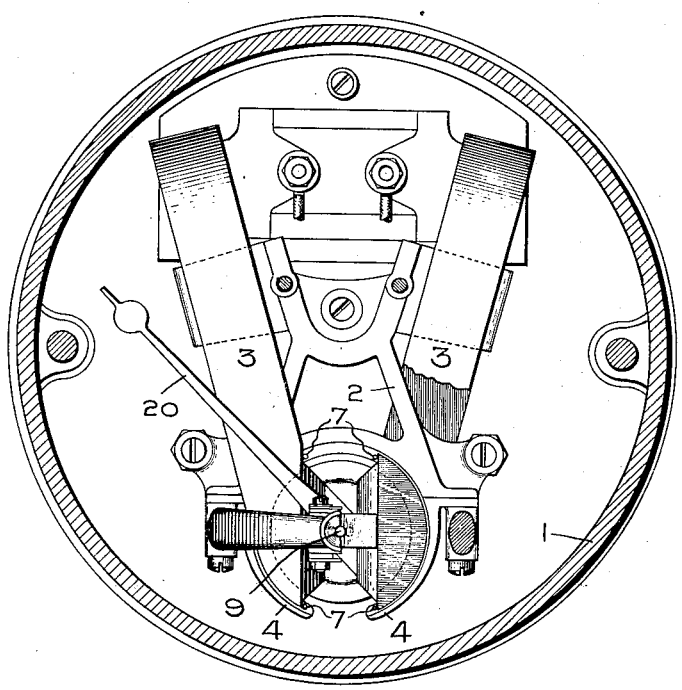

No. 835,322.  
PATENTED NOV. 6, 1906.  
W. H. PRATT.  
ELECTRIC MEASURING INSTRUMENT.  
APPLICATION FILED MAY 24, 1904.

Witnesses:  
Marcus L. Byng.  
Helen Orford

Inventor,  
William H. Pratt,  
By Albert G. Davis  
Att'y.

No. 835,322. PATENTED NOV. 6, 1906.
W. H. PRATT.
ELECTRIC MEASURING INSTRUMENT.
APPLICATION FILED MAY 24, 1904.
2 SHEETS—SHEET 2.
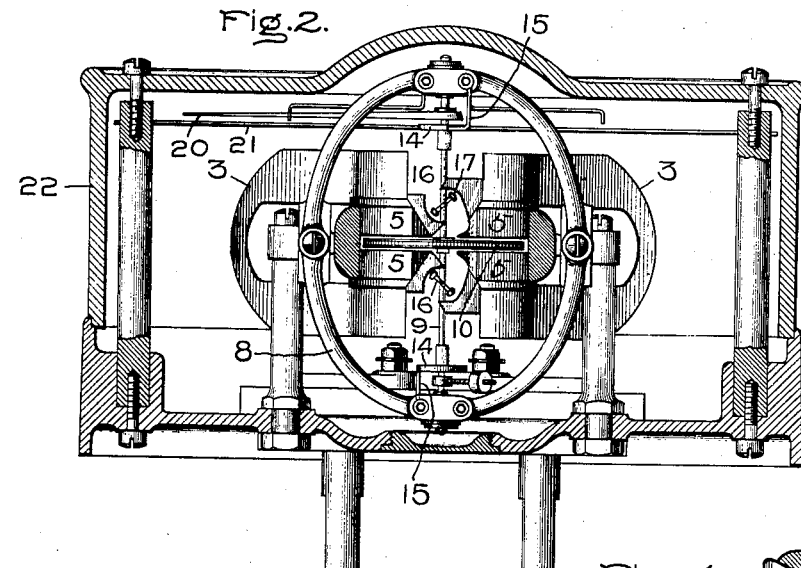
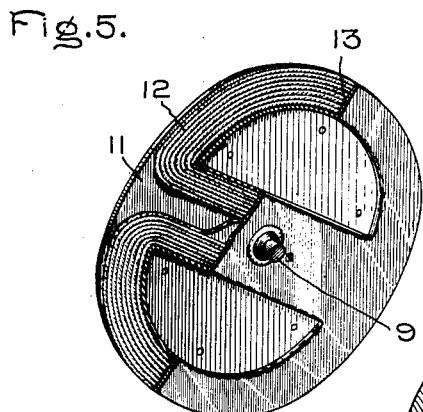
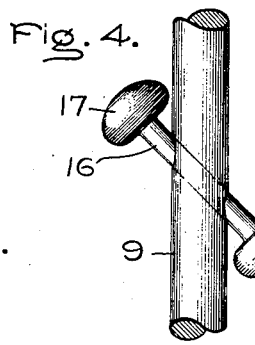
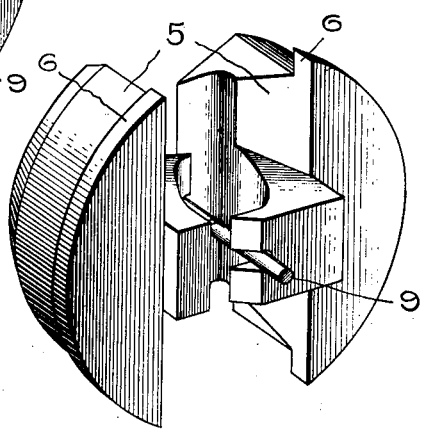
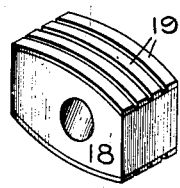
Witnesses:
Marcus L. Byng.
Helen Oxford
Inventor,
William H. Pratt,
By Albert B. Dam
Att'y.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC MEASURING INSTRUMENT.

No. 835,322.  Specification of Letters Patent.  Patented Nov. 6, 1906.

Application filed May 24, 1904. Serial No. 209,571.

*To all whom it may concern:*

Be it known that I, WILLIAM H. PRATT, a citizen of the United States, residing at Lynn, county of Essex, State of Massachusetts, have invented certain new and useful Improvements in Electric Measuring Instruments, of which the following is a specification.

This invention relates to electric indicating instruments; and its object is to effect certain improvements in instruments of this type whereby the movements of the moving indicating system per unit of the energy or energy factor measured by the instrument shall be equal at all parts of a wide range of movement of the indicator, so that the markings on the scale of the instrument shall be evenly distributed throughout the scale.

A further object of the invention is to simplify the construction of such instruments, and thereby reduce the cost of production.

Electric indicating instruments have been constructed heretofore having a counter-torque device consisting of a return element of magnetizable material mounted for rotation in a magnetic field to furnish the zero-seeking force. This return-piece has been mounted obliquely on the shaft of the instrument, and the pole-faces of the magnet have been chamfered off, so that when the indicator is at zero the axis of the return-piece is substantially perpendicular to the pole-faces, as is shown and described in the patent to Robinson, No. 751,015. With such a construction the movements of the indicator per unit of the energy or energy factor measured are not exactly equal at all parts of the scale, so that the scale-markings are not as evenly distributed as is desired, the markings being more open at the upper end of the scale than at the lower. After much experiment I have found that by varying the shape of the pole-faces which are presented to the return element the scale-markings can be made even throughout the scale or can be made open at any desired portion and closed at another or other portions.

When it is desired to make the scale-markings even throughout, I so form the pole-faces coöperating with the return element that they overhang the latter somewhat and partially surround it, so that the air-gap between the pole-faces and the return-piece as the latter turns with the shaft of the instrument either increases very slightly or does not increase at all. In the latter case, and preferably in all cases, I use a return-piece having its ends rounded off not only in order to secure a smooth counter-torque gradient, but also for the reason that though the actual shortest distance between the return-piece and the pole-faces does not increase the air-gap for all the effective lines of force which thread the return-piece increases slightly, so that the return-piece always exerts a force tending to bring the indicator to the zero position.

For certain uses of electric indicating instruments permanent magnets are preferred to electromagnets; but on account of the hardness and brittleness of the steel from which permanent magnets are made forming pole-faces of special shape on them or securing separate pole-pieces to them has heretofore been both difficult and expensive. I have therefore provided pole-pieces for the magnets which fit on a non-magnetic frame and are held tightly thereon by the spring action of the legs of the magnets, and I find that this arrangement of the parts simplifies the instrument and effects a great saving in the cost of construction.

The novel features of my invention will be definitely indicated in the claims appended hereto. The details of construction and the mode of operation of my improved electric indicating instrument will be better understood by reference to the following description, taken in connection with the accompanying drawings, which show the preferred embodiment of my invention.

In the drawings, Figure 1 is a top view of the instrument with the casing in section and the scale removed. Fig. 2 is a sectional elevation of the same. Fig. 3 is a perspective view of two of the pole-pieces and the shaft of the instrument. Fig. 4 is an elevation of the magnetic return-piece. Fig. 5 is a perspective view of the armature broken away in part, and Fig. 6 is a perspective view of a modified form of return-piece.

Referring to the drawings, 1 indicates a base, on which is mounted a frame 2, of cast-brass or other non-magnetic material, having arms in which the magnets 3 3 are held, the magnets having their poles oppositely arranged in order to form an astatic field. At the lower end frame 2 is extended to form curved jaws 4 4, and the pole-pieces 5 5 are rounded on one side to fit within these curved jaws. On one end each pole-piece 5 is provided with a flange 6, which overhangs the side of one of the curved jaws 4 4 to support the pole-piece in position. Pins 7 7 are provided in the jaws 4 4 to properly locate the pole-pieces, and the latter are accurately machined, so that they fall readily into the proper position and fit tightly therein. The adjacent surfaces of the legs of magnets 3 3 are ground true, and the magnets are of such size that by springing the legs apart slightly they can be made to embrace the pole-pieces 5 5 when the latter are supported in position on the jaws 4 4 of frame 2, which serve as spacers to position the pole-pieces the requisite distance apart. The pole-pieces are thus held firmly in the proper position and in hard contact with the legs of the magnets by the spring action of the magnets themselves, thus obviating the use of screws or clamps for securing them to the magnets and avoiding a large part of the expense and trouble usually encountered in providing permanent magnets with pole-pieces of special shape.

Suitably mounted on base 1 is an auxiliary frame 8, in which are bearings for the shaft 9 of the instrument, which carries the armature 10, the latter being arranged for rotation between the poles 5 5 of each of the magnets. The construction of the armature is best shown in Fig. 5. It consists of a metallic disk 11, serving as a damper for the oscillations of the indicator, as is well understood, on either side of which the coils 12 are mounted, as shown, and covered with sheet aluminium 13 or other suitable material. Current is led to the armature-coils by the ductile spirals 14, each of which has one end attached to the shaft 9 and the other to a bracket 15, secured to but insulated from frame 8. Shaft 9 carries an indicator 20, which moves back and forth over a scale 21, suitably mounted on the base of the instrument, and the casing 22, which incloses the parts, is provided with a glass, through which the positions of the indicator with reference to the scale are read.

In addition to the faces presented to the armature 10 pole-pieces 5 5 have auxiliary pole-faces formed thereon to establish magnetic fields between the opposite poles of the two magnets. Mounted on shaft 9, at an incline thereto, are the magnetic return-pieces 16 16, adapted to rotate in these auxiliary magnetic fields to furnish a counter torque opposing the turning moment and tending to restore the moving indicating system to the zero position. The magnetic return-piece which I prefer to use is that shown in Fig. 4, and consists of a rod 16 of such small section that it is at all times saturated by the flux of the magnets, having its ends enlarged and rounded off, as shown at 17.

The form of return element shown in Fig. 6 is a body 18 of non-magnetic material having strips of filaments 19 of iron, nickel, or other magnetic substance on its sides, the purpose of the longitudinal divisions being to prevent the flux from flowing across the piece. The auxiliary pole-faces of the magnets are concaved or hollowed out, so that each pole-piece has a portion overhanging the return-piece 16, as shown. This overhanging portion carries the lines of force as the return-piece turns with shaft 9, so that the air-gap increases in length very slightly or not at all. If the overhanging portion of the pole-piece is so formed that the actual shortest distance traversed by any of the lines of force in passing from the pole-piece to the return-piece does not increase, still the air-gap for all the effective lines of force threading the return-piece will increase somewhat, and that increase will be smooth and gradual, since the area of the enlarged rounded ends of the return-piece that is within this minimum distance of the pole-pieces is gradually reduced as the rounded ends recede from the portions of the pole-faces which bend around more nearly parallel to shaft 9. By this construction, employing a return-piece to furnish counter torque, mounted on the shaft of the instrument at an incline thereto in a magnetic field, the axis of which is also inclined to the shaft, the range of indication of the instrument extends through one hundred and twenty degrees or more, and I find that by shaping the pole-faces as shown herein the movements of the moving indicating system per unit of the energy or energy factor measured are equal at all parts of the scale, so that the scale-markings are evenly distributed for the whole of this wide range of indication.

What I claim as new, and desire to secure by Letters Patent of the United States, is—

1. An electric measuring instrument having a rotatable shaft, magnets for establishing a magnetic field, a magnetic return element mounted on the shaft at an incline thereto for rotation in said field, and pole-pieces for said magnets having concave faces.

2. An electric measuring instrument having a rotatable shaft, magnets for establishing a magnetic field, and a magnetic return element mounted on the shaft at an incline thereto for rotation in said field and furnishing counter torque for the moving indicating system, said magnets having their pole-faces so formed as to partially surround the return element.

3. An electric measuring instrument having means for establishing a magnetic field and a magnetic return element mounted for movement in said field and furnishing counter torque for the moving indicating system, the pole-pieces for said magnetic field being so formed that the shortest distance between them and said element remains constant as the element moves in the magnetic field and the return element being shaped to vary the flux which threads it.

4. An electric measuring instrument having a shaft, and a magnetic return element furnishing counter torque for the moving indicating system mounted on the shaft and consisting of a rod of magnetizable material having enlarged rounded ends.

5. An electric measuring instrument having a rotatable shaft, a magnetic return-piece to furnish counter torque mounted on the shaft at an incline thereto and consisting of a rod of magnetizable material having enlarged rounded ends, and means for establishing a magnetic field in which the return-piece revolves, said rod being of such cross-section that it is always saturated by the flux of said field.

6. In an instrument, a permanent magnet, and pole-pieces therefor clamped in position by the spring action of the magnet.

7. In an instrument, a permanent magnet, a spacer of non-magnetic material, and pole-pieces for the magnet clamped in position against the spacer by the spring action of the magnet.

8. In an instrument, a permanent magnet, a spacer of non-magnetic material, and pole-pieces for the magnet having flanges thereon engaging the spacer, said pole-pieces being clamped to the spacer by the spring action of the magnet.

9. An electric measuring instrument having a base, a frame of non-magnetic material secured thereto, permanent magnets supported by the frame, extensions on the frame forming jaws, and pole-pieces for the magnets clamped in position against the jaws by the spring action of the magnet.

10. An electric measuring instrument having a base, a frame of non-magnetic material secured thereto, permanent magnets supported by the frame, extensions integral with the frame forming spacers, and pole-pieces for the magnets having flanges thereon engaging the spacers, said pole-pieces being clamped to the spacers by the spring action of the magnets.

In witness whereof I have hereunto set my hand this 21st day of May, 1904.

WILLIAM H. PRATT.

Witnesses:
 DUGALD McK. McKILLOP,
 JOHN J. WALKER.